US010665083B1

(12) United States Patent
Vang (10) Patent No.: US 10,665,083 B1
(45) Date of Patent: May 26, 2020

(54) KEYWAY ILLUMINATION AND KEY-LOSS PREVENTION SYSTEM AND METHOD

(71) Applicant: Nipong Vang, York, PA (US)

(72) Inventor: Nipong Vang, York, PA (US)

( * ) Notice: Subject to any disclaimer, the term of this patent is extended or adjusted under 35 U.S.C. 154(b) by 0 days.

(21) Appl. No.: 16/284,344

(22) Filed: Feb. 25, 2019

(51) Int. Cl.
*G08B 21/24* (2006.01)
*H04W 4/021* (2018.01)
*G01S 1/02* (2010.01)
*H05B 47/19* (2020.01)

(52) U.S. Cl.
CPC .............. *G08B 21/24* (2013.01); *G01S 1/024* (2013.01); *H04W 4/021* (2013.01); *H05B 47/19* (2020.01)

(58) Field of Classification Search
None
See application file for complete search history.

(56) References Cited

U.S. PATENT DOCUMENTS

| | | | |
|---|---|---|---|
| 2,480,223 A | 8/1949 | Costanzo | |
| 4,276,582 A * | 6/1981 | Burnett | E05B 17/103 362/116 |
| 4,293,894 A | 10/1981 | Blank | |
| 4,779,171 A * | 10/1988 | Ferguson | E05B 17/10 362/100 |
| 4,787,016 A * | 11/1988 | Song | E05B 17/103 362/116 |
| 5,541,817 A * | 7/1996 | Hung | E05B 17/103 362/116 |
| 5,634,710 A | 6/1997 | Di Russo | |
| 5,729,057 A | 3/1998 | Frenzel | |
| 5,803,581 A | 9/1998 | Brockmann | |
| 6,132,058 A * | 10/2000 | Kuo | E05B 17/103 362/116 |
| 6,224,228 B1 * | 5/2001 | Frederick | E05B 17/103 362/116 |
| 6,386,007 B1 * | 5/2002 | Johnson | G01S 3/38 70/257 |
| 7,036,950 B1 * | 5/2006 | Freeman | E05B 17/10 362/100 |
| 7,159,993 B1 * | 1/2007 | Lu | E05B 17/103 200/310 |

(Continued)

*Primary Examiner* — Chico A Foxx
(74) *Attorney, Agent, or Firm* — Vincent G. LoTempio; David T. Stephenson (57) ABSTRACT

A keyway illumination and key-loss prevention system and method provides a smart key having a master module, and a keyway having an integral slave module. The modules are in operational communication with a mobile communication device. The mobile communication device is operable with a positional detection software application that identifies relative positions of the master and slave module. The slave module generates a geofence near keyway. The master module transmits a signal defining positional information. The positional information includes the position of master module, relative to the slave module. The positional detection software processes the positional information from the emitted signal. The positional detection software triggers the communication device to actuate an alert when the positional information indicates the master module has exited the geofence of the keyway. An illumination device is operable to illuminate when the positional information indicates the master module has entered the geofence of the keyway.

19 Claims, 8 Drawing Sheets

(56) References Cited

U.S. PATENT DOCUMENTS

| | | | | |
|---|---|---|---|---|
| 7,329,021 | B1 * | 2/2008 | Hoffman | B60R 25/24 |
| | | | | 362/116 |
| 7,510,301 | B2 * | 3/2009 | Dial | A45C 13/20 |
| | | | | 362/100 |
| 7,628,503 | B1 * | 12/2009 | Pumm | E05B 17/103 |
| | | | | 362/109 |
| 7,832,887 | B2 * | 11/2010 | Battle | E05B 17/10 |
| | | | | 362/100 |
| 8,085,125 | B2 * | 12/2011 | Bigdely Shamlo | E05B 19/22 |
| | | | | 340/5.2 |
| 8,390,448 | B2 * | 3/2013 | Weinstein | G07C 3/08 |
| | | | | 340/407.1 |
| 8,552,875 | B2 * | 10/2013 | Burdenko | E05B 47/026 |
| | | | | 340/5.26 |
| 9,061,427 | B2 * | 6/2015 | Rubin | B26B 11/00 |
| 9,611,673 | B1 * | 4/2017 | Vo | E05B 19/0082 |
| 10,097,265 | B2 * | 10/2018 | Aggarwal | H04B 10/116 |
| 10,352,512 | B1 * | 7/2019 | Smith | F21V 23/0464 |
| 10,354,466 | B1 * | 7/2019 | Yang | H05B 47/16 |
| 2005/0259411 | A1 * | 11/2005 | Chen | E05B 17/103 |
| | | | | 362/116 |
| 2006/0215394 | A1 * | 9/2006 | Evans | E05B 17/103 |
| | | | | 362/116 |
| 2007/0159811 | A1 * | 7/2007 | Chen | E05B 17/103 |
| | | | | 362/116 |
| 2009/0261973 | A1 * | 10/2009 | Eakle, Jr. | E05B 41/00 |
| | | | | 340/540 |
| 2018/0265040 | A1 * | 9/2018 | Nowottnick | B60R 25/01 |

\* cited by examiner

KEYWAY ILLUMINATION AND KEY-LOSS PREVENTION SYSTEM AND METHOD

FIELD OF THE INVENTION

The present invention relates generally to a keyway illumination and key-loss prevention system and method. More so, the system provides a smart key having a master module, and a keyway having an integral slave module; whereby the modules are in operational communication with a mobile communication device that is operable with a positional detection software application; whereby the positional detection software identifies relative positions of the master and slave module for actuating an illumination device when the smart key enters the geofence of the keyway, and triggering an alert when the smart key exits the geofence of the keyway.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that a key is a device that is used to operate a lock. The key serves to lock or unlock the lock, keyway, gate, etc. A typical key is a small piece of metal consisting of two parts: the blade, which slides into the keyway of the lock and distinguishes between different keys, and the bow, which is left protruding so that torque can be applied by the user. The key serves as a security token for access to the locked area; only persons having the correct key can open the lock and gain access to a gate, door, vehicle ignition, and the like.

Generally, door lock keys are devices that allow security access to its user. However, the inexpensive device can become difficult to use in locations with poor lighting, owing to weather conditions, time of day or physical orientation of the lock. To address this problem, illumination is the required solution. There are night light devices that illuminate around the keyway in conditions that ordinarily make the key's usage difficult.

A geofence is a virtual perimeter for a geographic location. Geofencing is a location-based service in which an app or other software uses GPS, RFID, Wi-Fi or cellular data to trigger a pre-programmed action when a mobile device or RFID tag enters or exits a virtual boundary set up around the geographical location. A geo-fence could be dynamically generated—as in a radius around a point location, or a geo-fence can be a predefined set of boundaries.

Other proposals have involved illuminating keyways, and identifying the location of lost keys. The problem with these illumination devices is that they do not provide an independent source for locating and alerting to the lost key. Also, the illumination is not triggered effectively when the key approaches the keyway. Also, they do not indicate if the matching key is being used in the keyway. Even though the above cited illuminating keys and lost-key alerts meet some of the needs of the market, a keyway illumination and key-loss prevention system that provides a smart key having a master module, and a keyway having an integral slave module; whereby the modules are in operational communication with a mobile communication device that is operable with a positional detection software application; whereby the positional detection software identifies relative positions of the master and slave module for actuating an illumination device when the smart key enters the geofence of the keyway, and triggering an alert when the smart key exits the geofence of the keyway, is still desired.

SUMMARY

Illustrative embodiments of the disclosure are generally directed to a keyway illumination and key-loss prevention system and method. The system provides a smart key having a master module, and a keyway having an integral slave module. The modules are in operational communication with a mobile communication device. The mobile communication device is operable with a positional detection software application that identifies relative positions of the master and slave module, actuates an illumination device, and triggers an alert.

The slave module generates a geofence near the keyway. The master module transmits a signal that is defined by positional information. The positional information includes the position of the master module in the smart key, relative to the slave module in the keyway. The positional detection software processes the positional information from the emitted signal. The positional detection software triggers the communication device and/or the smart key to actuate an alert when the positional information indicates the master module has exited the geofence of the keyway. Such a position-dependent alert can be helpful for locating the smart key when it is lost or misplaced.

An illumination device is operable to illuminate when the positional information indicates the master module has entered the geofence of the keyway. The illumination is oriented towards the entry of the keyway. The directional illumination can be helpful for enhancing visual identification of the keyhole; especially in the dark.

In one aspect, a keyway illumination and key-loss prevention system, comprises:

a smart key comprising a blade and a housing, the blade being sized and dimensioned to engage a keyway, the housing applying torque on the blade during engagement with the keyway;

a master module operational in the housing of the smart key, the master module emitting a signal, the signal defining a positional information of the smart key;

a slave module operational near the keyway, the slave module generating a geofence in proximity to the keyway;

a communication device being in operational communication with the slave module near the keyway, the communication device further being in operational communication with the master module in the smart key, the communication device having a positional detection software, the positional detection software processing the positional information of the signal, the communication device, or the master module, or both, emitting an alert when the positional information indicates the master module exits the geofence of the keyway; and an illumination device operational at the housing of the smart key, the illumination device being in operational communication with the master module, the illumination device operational to illuminate when the positional information indicates the master module enters the geofence of the keyway.

In another aspect, the master module transmits short-wavelength UHF radio waves to the communication device when the positional information indicates the master module exits and enters the geofence.

In another aspect, the positional information comprises the position of the master module relative to the slave module.

In another aspect, the illumination device at the smart key is operational to illuminate when the positional information indicates the master module exits the geofence of the keyway.

In another aspect, the communication device manually activates the illumination device to illuminate.

In another aspect, the positional detection software uses at least one of the following to trigger the alert from the communication device: a global positioning system, a radio frequency identification, an electromagnetic frequency, Wi-Fi, and cellular data In another aspect, the positional detection software uses at least one of the following to trigger the illumination from the illumination device: a global positioning system, a radio frequency identification, an electromagnetic frequency, Wi-Fi, and cellular data.

In another aspect, the positional detection software processes the positional information to detect virtual proximity of the master module to the slave module through at least one of the following: Wi-Fi, the global positioning system, an electromagnetic frequency, or a radio frequency.

In another aspect, the positional detection software comprises a downloadable software application.

In another aspect, the positional detection software is in communication with a radio tower or a global positioning system.

In another aspect, the signal emitted from the master module comprises an infra-red signal.

In another aspect, the alert from the communication device comprises a buzzer or a light.

In another aspect, the housing of the smart key comprises a power source.

In another aspect, the engagement of the blade with the keyway is operable to lock and unlock the keyway.

In another aspect, the illumination device is a light emitting diode.

In another aspect, the illumination device is oriented to illuminate directly on the keyway.

In another aspect, the communication device is operable with short-wavelength UHF radio waves.

In another aspect, the communication device includes at least one of the following: a smart phone, a tablet, a laptop, a computer, and a server.

In another aspect, the communication device comprises a voice command software, then voice command software operable to trigger the alert when detecting a preprogrammed audible signal.

One objective of the present invention is to illuminate the illumination device when the smart key moves proximally, within the geofence of the keyway.

Another objective is to provide a slave and master module that communicate with software on a mobile communication device.

Another objective is to find a lost key by emitting an alert in the communication device when the key has exited the geofence of the keyway.

Another objective is to provide a downloadable positional detection software for a smart phone.

Another objective is to allow a user to select and customize the color of their choice as to what the device will illuminate through for its LED.

Another objective is to allow a user to add or delete multiple Bluetooth smart key profiles created and saved to the positional software application.

Another objective is to allow a user to add or delete multiple Bluetooth smart key profiles created and saved to the software application.

Another objective is to allow a user to provide the option of either having the LED illuminate or the implemented buzzer on to emit sound to help locate the smart key.

Another objective is to allow a user to allow for manual triggering of the Led or buzzer alerts on the Bluetooth smart key to help in locating the smart key.

Another objective is to provide a smart key housing that supplements the bow of a key to enable turning the key in the keyway, and also communicates with the slave module to actuate the illumination device.

Yet another objective is to indicate through Bluetooth communication and matching LED lights on the smart key and the slave module, the matching key for the keyway.

Yet another objective is to provide an inexpensive, easily accessible power source for the smart key.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A keyway illumination and key-loss prevention system 100 and method is referenced in FIGS. 1-10. As referenced in FIG. 1, the keyway illumination and key-loss prevention system 100, hereafter "system 100" provides a smart key 102 having a master module 104; a keyway 106 having an operational slave module 108; and a communication device 110a-c having a downloadable positional detection software application 112. These components work together for autonomous illumination of an illumination device 114 in smart key 102, and for triggering an alert 116 from the communication device 110a-c and/or the smart key 102. Both illuminating and alerting functions are dependent on the position of the smart key 102 relative to a geofence 118 around the keyway 106.

Figure 1:
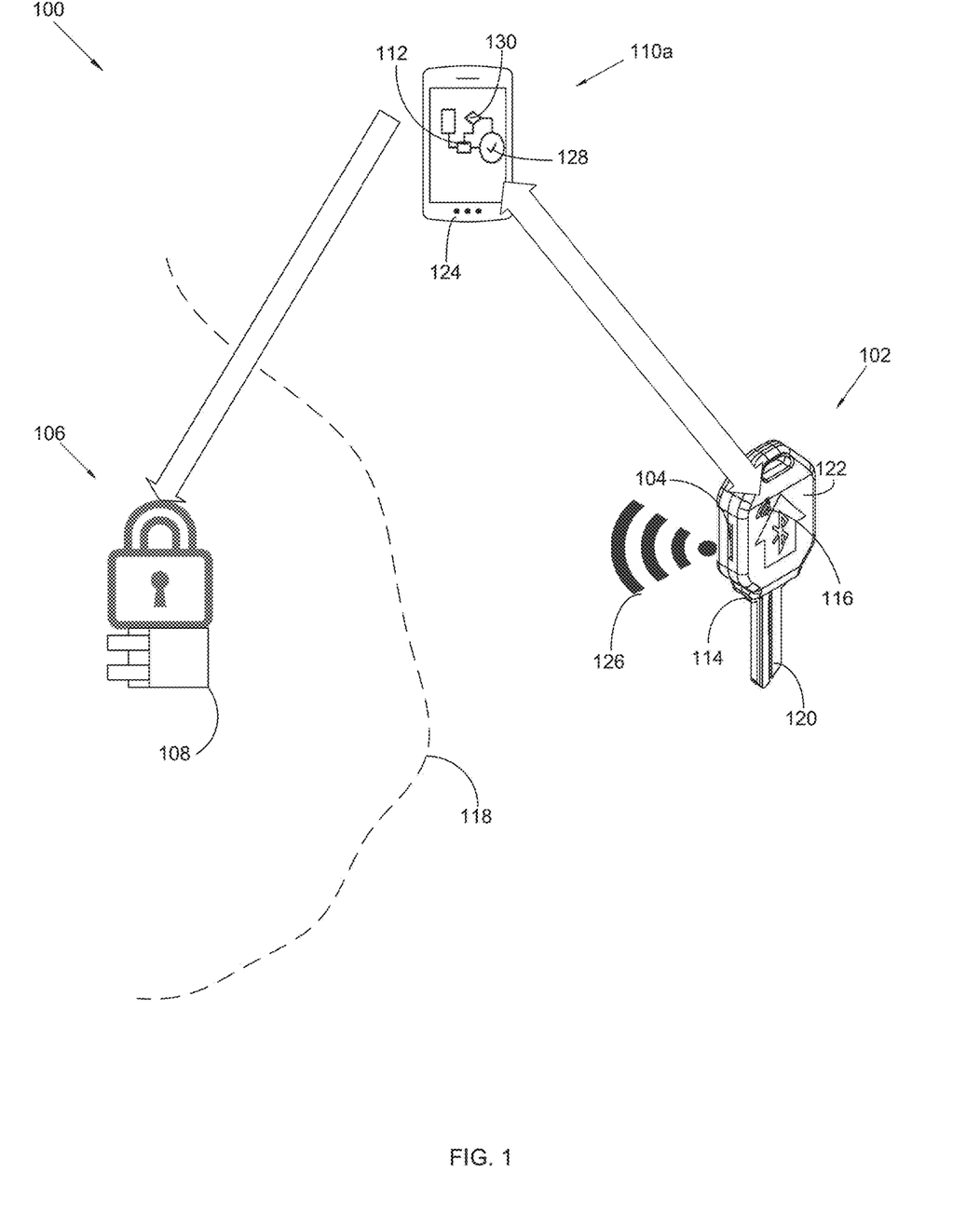
FIG. 1 illustrates a bloc diagram of an exemplary keyway illumination and key-loss prevention system, in accordance with an embodiment of the present invention.

In this manner, when a mobile communication device 110a-c, such as a smart phone, laptop, tablet, etc., is detected inside the geofence 118 of the keyway 106, an illumination device 114 in the smart key 102 directs lighting towards the keyway 106. Also, when the smart key 102 is lost, the mobile communication device 110a-c emits a signal 126 that triggers an alert 116, such as a buzzer or light, in the smart key 102 and/or the communication device 110a-c, so as to help locate the missing smart key 102.

Figure 2:
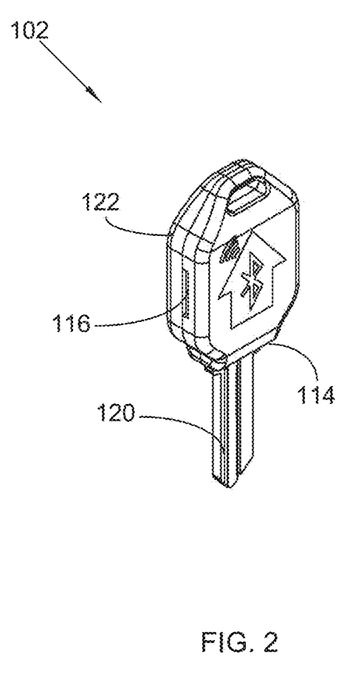
FIG. 2 illustrates a perspective view of an exemplary smart key, in accordance with an embodiment of the present invention.

As referenced in FIG. 2, system comprises a smart key 102. Smart key 102 has the dual effect of operating as a standard key, and communicating with positional software application to alert 116, illuminate, and generally emit position signals relative to a geofence 118 in a corresponding keyway 106. It is significant to note that smart key 102 does not detect signals or frequencies. But rather, smart key 102 connects to a communication device 110a-c through Bluetooth, or other known communication means, to follow a specific command from a positional detection software 112 application that is operational in the communication device 110a-c. It is communication device 110a-c that substantially controls the illumination and alert functions described herein.

Figure 3:
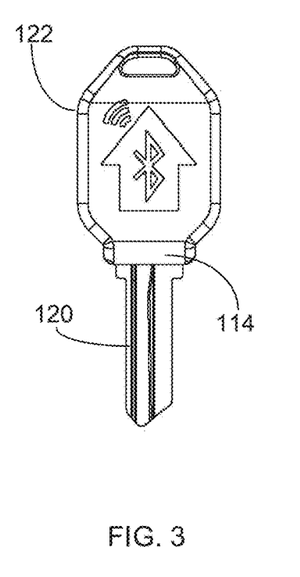
FIG. 3 illustrates a frontal view of the smart key shown in FIG. 2, in accordance with an embodiment of the present invention.

As illustrated in FIG. 3, smart key 102 includes a blade 120 and a housing 122. Blade 120 is sized and dimensioned to engage a keyway 106. Housing 122 has a slot that receives one end of blade 120. Housing 122 allows for a portion of blade 120 to extend from housing 122, so as to engage keyway 106. In this manner, smart key 102 engages the keyway 106 and locks and unlocks a gate, door, vehicle ignition, etc. In one embodiment, housing 122 is bifurcated, and uses a plurality of fasteners to fasten the two halves of the housing 122 around the internal components. In some embodiments, fasteners for housing may include, without limitation, screws, bolts, magnets, snap-lock mechanisms, and an adhesive.

Figure 5:
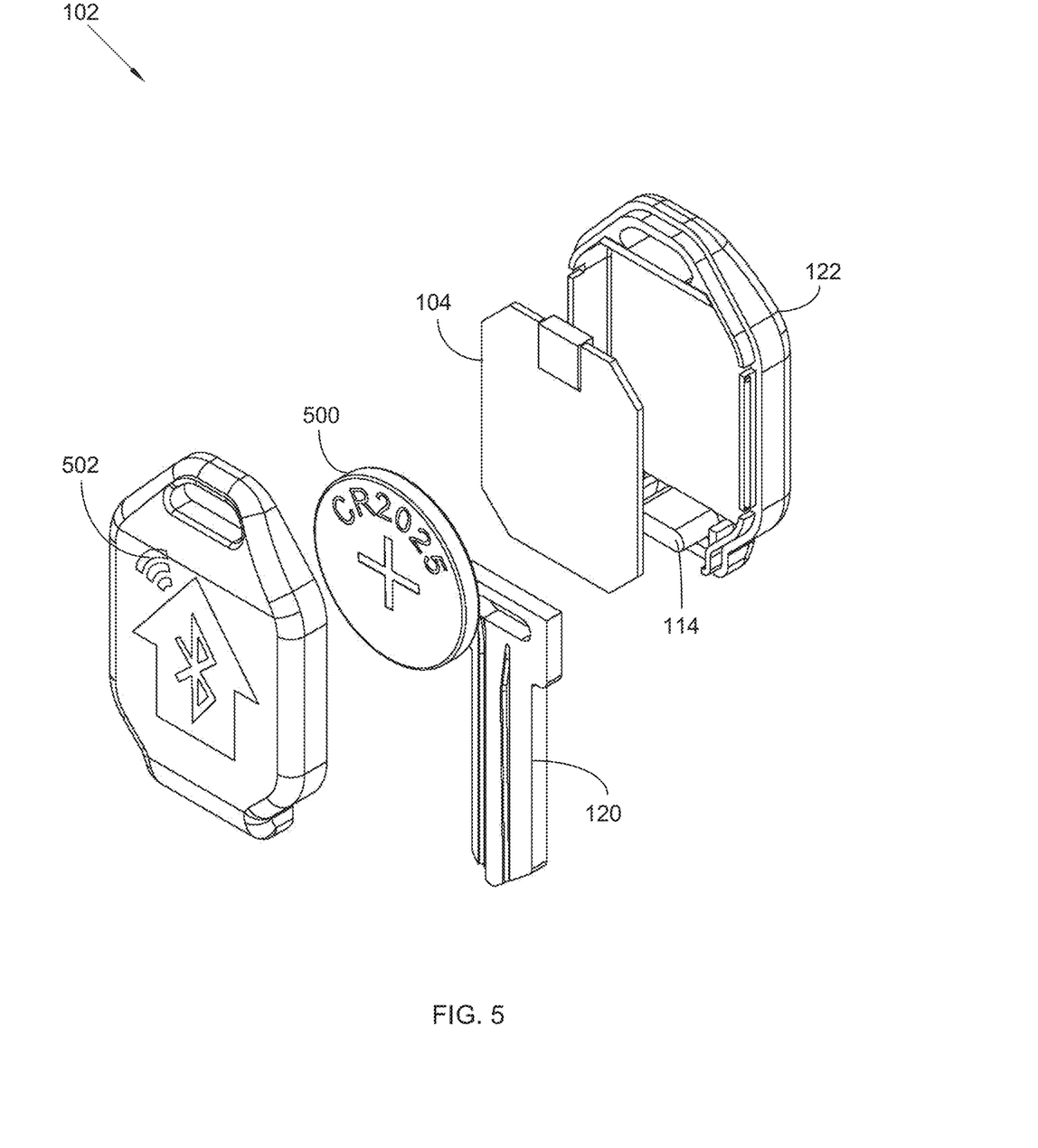
FIG. 5 illustrates a blow up view of the smart key shown in FIG. 2, including a master module and a power source in the housing, in accordance with an embodiment of the present invention.

Furthermore, housing 122 includes a power source 500 to help power the electrical components contained therein, i.e., master module 104, illumination device 114. (FIG. 5). In one embodiment, power source is a coin shaped cell (CR1616), or a small three volt disposable lithium cell that serves as a power source for the electronic components in the housing 122. A power source enclosure may also be used to retain the power source 500.

In one alternative embodiment, housing 122 is shaped and dimensioned to house a printed circuit board (PCB) that carries the various electrical components and wiring, and enables simple processing by housing 122. In one embodiment, PCB is a plastic wafer that houses electronic components, and contains lead soldering and copper traces. PCB may have dimensions of 20.5×27.5×2 millimeters. In one embodiment, a rubber panel positions between PCB and housing 122 to protects PCB from static charge and electric conduction.

Figure 4:
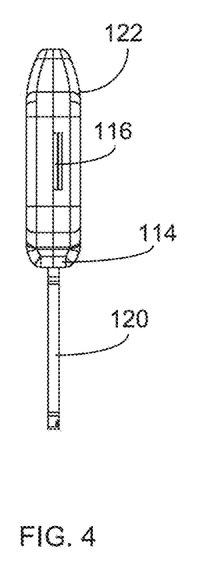
FIG. 4 illustrates a side view of the smart key shown in FIG. 2, in accordance with an embodiment of the present invention.

Looking now at FIG. 4, housing 122 may also include a plurality of switches that operate the electronic components of the case PCB. This may include three unique switches that perform different functions upon being depressed, toggled, or flipped. One of the switches may include a power switch that regulates power to smart key 102, including operation of illumination device 114, described below. One exemplary embodiment of switches may include three plastic push buttons labeled as follows: a boot switch that turns on the smart key; a mode switch that allows changing various operational modes of system; and a north switch that depresses against a door knob to turn off the illumination. Though in different embodiments, other types of buttons, toggles, levers; and labeling thereof may be used in other embodiments.

Turning now to FIG. 5, system 100 also includes a master module 104 operational in the housing 122 of the smart key 102. Master module 104 emits a signal 126 that defines a positional information 702 of the smart key 102. In one non-limiting embodiment, the emitted signal 126 from master module 104 comprises an infra-red signal. In other embodiments, master module 104 communicates through Bluetooth. Such Bluetooth communication may include transmitting short-wavelength UHF radio waves to a communication device 110a-c when the positional information 702 calculated by the software indicates the master module 104 has exited or entered the geofence 118 of keyway 106.

In some embodiments, system 100 also includes a slave module 108 operational near the keyway 106. Slave module 108 generates a geofence 118 in proximity to the keyway 106. Geofence 118 is the constant from which the illumination device 114 and alert 116 are triggered, relative to the position of smart key 102, as described below.

Figure 6:
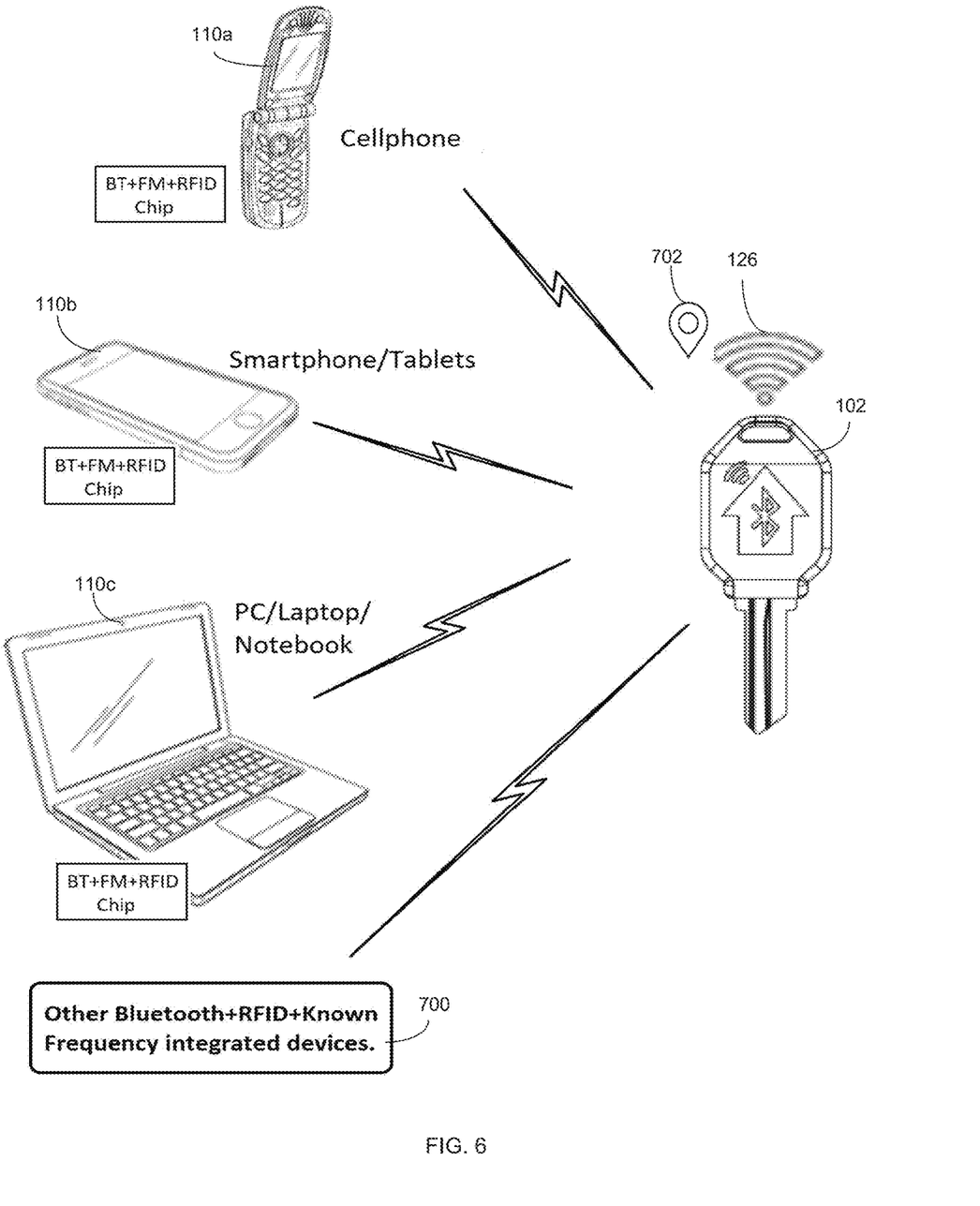
FIG. 6 illustrates a perspective view of the smart key connectivity options operable with various communication devices and signaling means, in accordance with an embodiment of the present invention.

FIG. 6 illustrates a perspective view of the smart key connectivity options operable with various communication devices and signaling means. The smart key 102 is operational for communicating with, commanding, and viewing the status of communication devices 110a, 110b, 110c. In one embodiment, smart key 102 communicates with a cellphone 110a through BT+FM+RFID Chip. Smart key 102 may also communicate with a smartphone or tablet 110b through the same BT+FM+RFID Chip. Further, the smart key 102 can communicate with a PC, or laptop, or notebook 110c through BT+FM+RFID Chip. Smart key 102 may also communicate with other Bluetooth and RFID frequency integrated devices 700.

As illustrated in FIG. 6, a Software-Integrated Device 110a, 110b, 110c (e.g. smartphone, tablet, laptop) is the Master Module, while the Smart Key Device 102 is the Slave Module. Specifically, the Software-Integrated Device (e.g. smartphone, tablet, laptop) is the Master Module; which functions to customize settings for Smart Key Device. The "Master Module" acts as a Positional Detection Software Device and Key-Loss system. The software generates specific virtual proximity for connected slave devices to interact with the Master Module. However, the Smart-key Device 102 is the Slave Module. The devices only functionality is to obey specific command from the Master Module via manual or automotive purposes.

As further depicted in FIG. 6, system 100 also includes at least one communication device 110a-c that is generally mobile, and is used to communicate with, command, and view the operational status of smart key 102. Communication device 110a-c is in operational communication with the slave module 108 near the keyway 106. Communication device 110a-c is also in operational communication with the master module 104 in the smart key 102. In this manner, communication device 110a-c forms a communication nexus therebetween, and controls all aspects of smart key 102 and geofence 118 generated by slave module 108. And it is communication device 110a-c, not smart key 102 that controls the positional information 702 and triggering of the illumination and alerts described below.

Communication device 110a-c is mobile and may be carried separately from smart key 102. Communication device 110a-c may include, without limitation, a smart phone 110a, a tablet, a laptop 110b, a computer 110c, and a server. In yet other embodiments, a smart home hub can be used to operate the positional software and communicate with the smart key 102, through the modules.

In some embodiments, communication device 110a-c has contained thereon, a positional detection software 112, which may be a downloadable software application. Positional detection software 112 is configured to process the positional information 702 of the signal 126 from master module 104. Positional information 702 may include the position of master module 104 relative to the position of slave module 108. To accomplish this, positional information 702 may contain and process various positioning metrics, including: coordinates; GPS tracking means; radio signaling; calculations of distance in inches, feet, miles; and other known means to track and identify a position.

Specifically, positional detection software 112 processes the positional information 702 to detect the virtual proximity of the master module 104 to the slave module 108. This detection and communication may be through one of the following: Wi-Fi, the global positioning system (GPS), an electromagnetic frequency, or a radio frequency. Thus, it may be that positional detection software 112 is in communication with a radio tower or the GPS. Further, the communication device 110a-c is operable with short-wavelength UHF radio waves, such as Bluetooth. System allows for the addition and deletion of multiple Bluetooth smart key profiles that can be created and saved to the positional software application.

Looking back at FIG. 1, smart key 102 is operable through the master module 104 to remain connected to communication device 110a-c at all times. In this manner, geofence 118 of keyway 106 can be detected, and smart key 102 can buzz or illuminate when triggered through mobile communication device 110a-c. Smart key 102 is functional to follow preset commands from positional detection software 112 application that may alter the geo fence parameters, the type of alert 116, the intensity of illumination, and other variables.

Thus, the purpose of smart key 102 is to only communicate and take specific commands from positional detection software 112. System 100 allows for full flexibility of manually or automatically controlling smart key 102 and communication device 110a-c through processing commands from the positional detection software 112 application.

This enables positional detection software 112 to trigger responses when communication device 110a-c enters or leaves geofence 118 of keyway 106. Specifically, communication device 110a-c, or the master module 104, or both, are configured to emit an alert 116 when the positional information 702 indicates the master module 104 exits the geofence 118 of the keyway 106. Thus, when communication device 110a-c moves out of range of geofence 118, the software application can be preset to alert 116 from either smart key 102 device or communication device 110a-c via notification.

In one non-limiting embodiment, the alert 116 from communication device 110a-c comprises a buzzer or a light. Communication device 110a-c can be programmed to provide the option of either having the LED illuminate or the implemented buzzer on to emit sound to help locate smart key 102. However, any alerting means known in the art, including a recorded human voice may also be used to alert 116. Additionally, positional detection software 112 application can automatically, or is programmable, to power off smart key 102 when outside geofence 118 of keyway 106.

In some embodiments, positional detection software 112 in communication device 110a-c is configured to trigger the alert 116 from communication device 110a-c through at least one of the following signaling means: a GPS, a radio frequency identification (RFID), an electromagnetic frequency, Wi-Fi, and cellular data.

Further, in one alternative embodiment, communication device 110a-c comprises a voice command software 130. Voice command software 130 is operable to trigger an alert 116 when detecting a preprogrammed audible signal, such as a human voice. Thus, a command, such as "Find the key", is processed by voice command software 130, creating a trigger that illuminates the illumination device 114 in the smart key 102, or the alert 116 in the smart key 102 or communication device 110a-c, or displaying a graphic map in the communication device 110a-c with a pointer/compass indicating location of smart key 102.

Looking again at FIG. 5, system provides an illumination device 114 that is operational at the housing 122 of the smart key 102. Illumination device 114 is in operational communication with the master module 104. Illumination device 114 is operational to illuminate when the positional information 702 indicates the master module 104 enters the geofence 118 of the keyway 106. Illumination device 114 is oriented to illuminate directly on the keyway 106, so as to help locate the keyway 106 in the dark. This achieves the objective of emitting a light from the illumination device 114 when the smart key 102 moves proximally, inside the geofence 118 of the keyway 106.

This type of directional lighting may be especially useful at night or in dark areas where visibility is limited. In some embodiments, a lens and a reflector may be positioned in front of illumination device 114 to enhance the translucence of the light beam. Illumination device 114 may have any number of colors and patterns, known in the art.

In one non-limiting embodiment, illumination device 114 is a light emitting diode (LED). The LED may have multiple colors that can be selected for different operations. The color can be selected and customized to achieve a desired illumination color and pattern of LEDs. In one embodiment, the illumination from illumination device 114 is generated from an LED that selectively emits red, yellow, and green colors.

In another embodiment, key illumination device 114 is a five millimeter LED that provides efficient illumination with a very low consumption of battery life. System allows for verification that the smart key 102 is engaging the correct matching keyway 106 through a unique LED color matching function. This can be useful when multiple objects have keyways that are clustered together, and it is not certain which key corresponds to the keyways.

In addition to illuminating when the master module 104 has entered the geofence 118; the illumination device 114 also illuminates when the positional information 702 indicates that master has module exited the geofence 118 of the keyway 106. This illuminating effect helps locate smart key 102 if misplaced or stolen. Positional detection software 112 detects location of communication device 110a-c, and can autonomously notify that communication device 110a-c has entered proximity to keyway 106.

Or, positional detection software 112 can autonomously activate the Bluetooth to either emit sound or activate illumination device 114. In yet other embodiments, communication device 110a-c is operational to manually activate illumination device 114 to illuminate through a manual switch 124. This helps to light up the smart key 102, even if the smart key 102 has not entered the geofence 118.

The positional detection software 112 in the communication device 110a-c is configured to trigger the illumination from the illumination device 114 through at least one of the following signaling means: a GPS, RFID, an electromagnetic frequency, Wi-Fi, and cellular data. Further, positional detection software 112 has an internal timer 128 that deactivates illumination after a predetermined duration. Thus, it is timer 128 that determines the duration of the light or sound. Timer 128 may include a digital counter or other counting means known in the art.

In another unique aspect of system 100, if the Bluetooth-enabled smart key 102 is lost, and a second communication device 110a-c locates the Bluetooth signal, the positional detection software 112 notifies that the lost smart key has been detected multiple times in that location. The software application shows the number of times other users mobile devices have detected that the device is within this proximity. In this manner, multiple other communication devices can be leveraged to locate smart key 102. This will help a user understand that smart key 102 is still near the location where communication was last established.

In one sequence of procedures for operating system 100, a slave module 108 in or near the keyway 106 generates a geofence 118 at a predetermined distance from the keyway 106. Smart key 102 approaches the keyway 106 while oriented towards the slave module 108. Positional detection software 112 in the communication device 110a-c calculates the position/distance of master module 104 relative to geofence 118 around keyway. Communication device 110a-c relays a command to the master module 104 to activate illumination device 114. Illumination is triggered to illuminate, directionally towards keyway 106, which enhances viewing of area around keyway 106.

Continuing, the smart key 102 moves distally from keyway 106 until exiting the geofence 118. Smart key 102 may later be misplaced, lost, or stolen. Positional detection software 112 in the communication device 110a-c calculates the position/distance of master module 104 relative to the geofence 118. Communication device 110a-c relays a command to master module 104 to activate the alert 116 and/or the illumination device 114. This helps in identifying the location of smart key 102.

Figure 7:
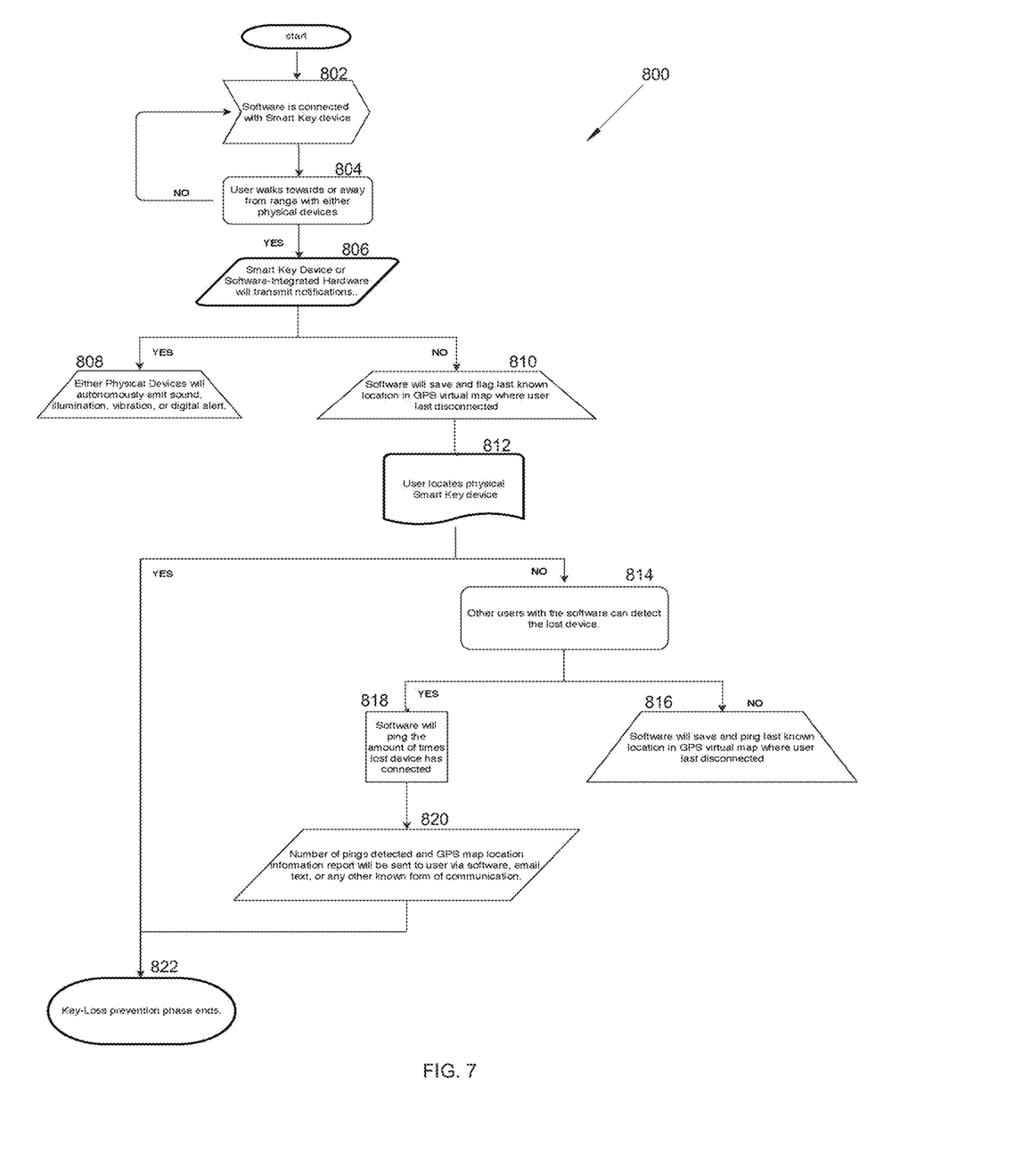
FIG. 7 illustrates a flowchart of an exemplary GPS location tracking process for the keyway illumination and key-loss prevention system, in accordance with an embodiment of the present invention.

FIG. 7 illustrates a flowchart of an exemplary GPS location tracking method 800 for the keyway illumination and key-loss prevention system. The method 800 is configured to help locate a loss smart key 102, so as to trigger a key-loss prevention. The method 800 may include an initial Step 802 of connecting a software application with the smart key 102. The software application is operable with GPS software.

Method 800 may further comprise a Step 804 of moving, by the user, towards or away from the geofence near the keyway. If the user moves away from the geofence, a Step 806 includes the software application transmitting a notification. If the notification is transmitted, a Step 808 includes the physical devices autonomously emitting sound, illumination, vibration, or digital alerts. If not, a Step 810 comprises the software saving, and flagging the last known location in the GPS virtual map where the users were last located. In some embodiments, a Step 812 may include the user locating a physical smart key 102, due to the alerts.

However, if the user locates the smart key, then a terminal Step 822 ends the key-loss prevention phase. However, if the smart key 102 is not located, a Step 814 includes other users detecting the smart key through Bluetooth connectivity. However if the other users still cannot detect the smart key 102, then a Step 816 includes the software saving the last known location in a GPS virtual map where the user last disconnected. Conversely, if the other users detect the smart key, a Step 818 allows the software to ping the number of times the lost device was connected. In a subsequent Step 820, the number of pings detected and the GPS map location are transmitted to the user via email, message, or other forms of communication. At which point, the terminal Step 822 ends the key-loss prevention phase.

Figure 8:
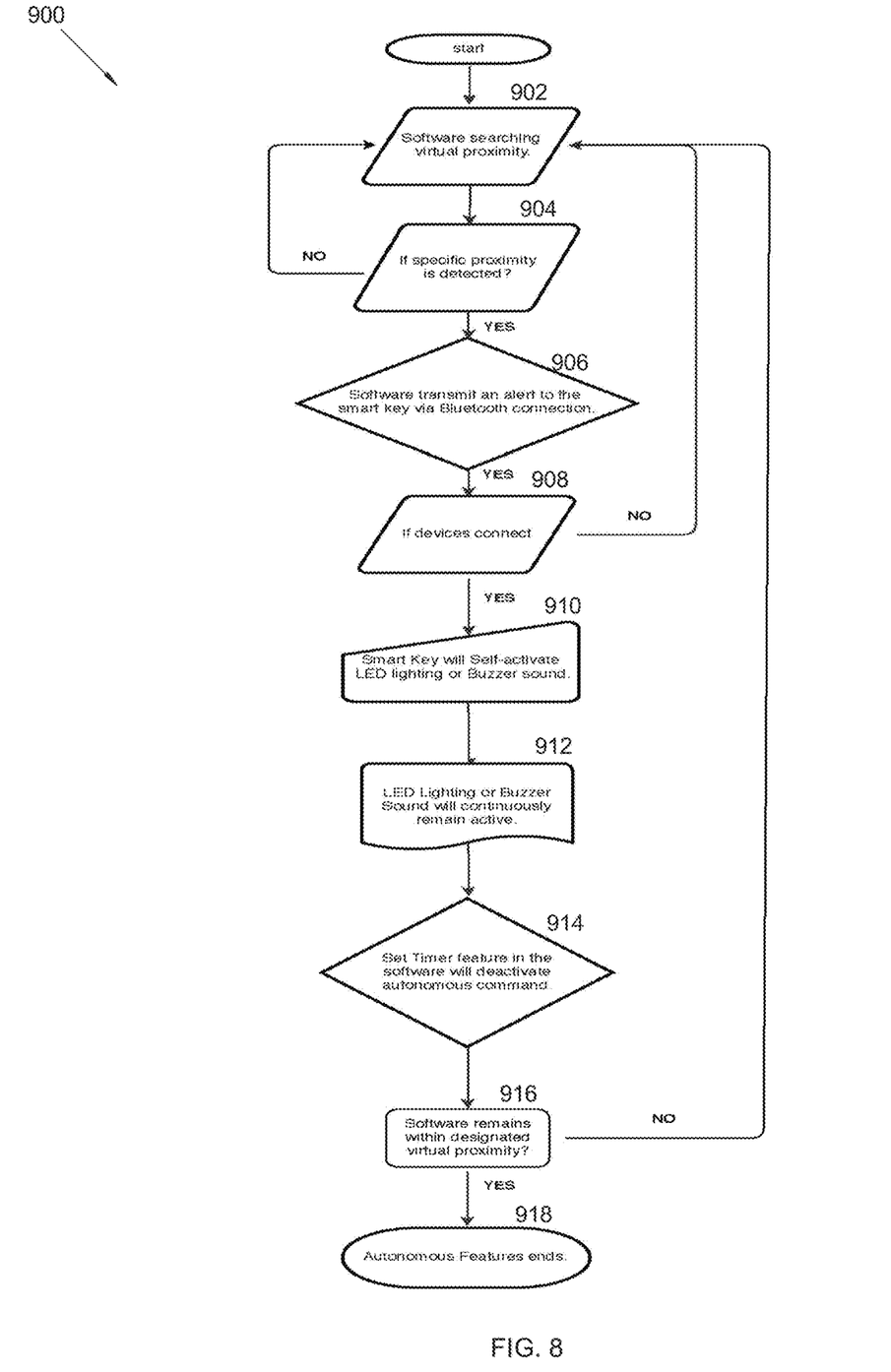
FIG. 8 illustrates a flowchart of an exemplary manual key finding process, in accordance with an embodiment of the present invention.

FIG. 8 illustrates a flowchart of an exemplary autonomous process 900 of the keyway illumination and key-loss prevention system. The process 900 may include an initial Step 902 of the software searching for virtual proximity to the geofence. The process 900 may further comprise a Step 904 of determining if specific proximity has been detected. If not, then the process 900 returns to Step 902. If proximity is detected, a Step 906 includes transmitting an alert to the smart key via Bluetooth.

If the devices connect in a Step 908 then the process 900 utilizes a Step 910 of the smart key self-activating an LED light or buzzer sound. If not, then a return to Step 902 where the smart key searches for proximity is used. Turning now to Step 912, the LED light or buzzer sound continually remain active. However, a Step 914 involves a timer being set to deactivate the autonomous command. A step 916 determines if the software remains within the designated virtual proximity of the geofence. If yes, then the autonomous feature terminates in a Step 918.

Figure 9:
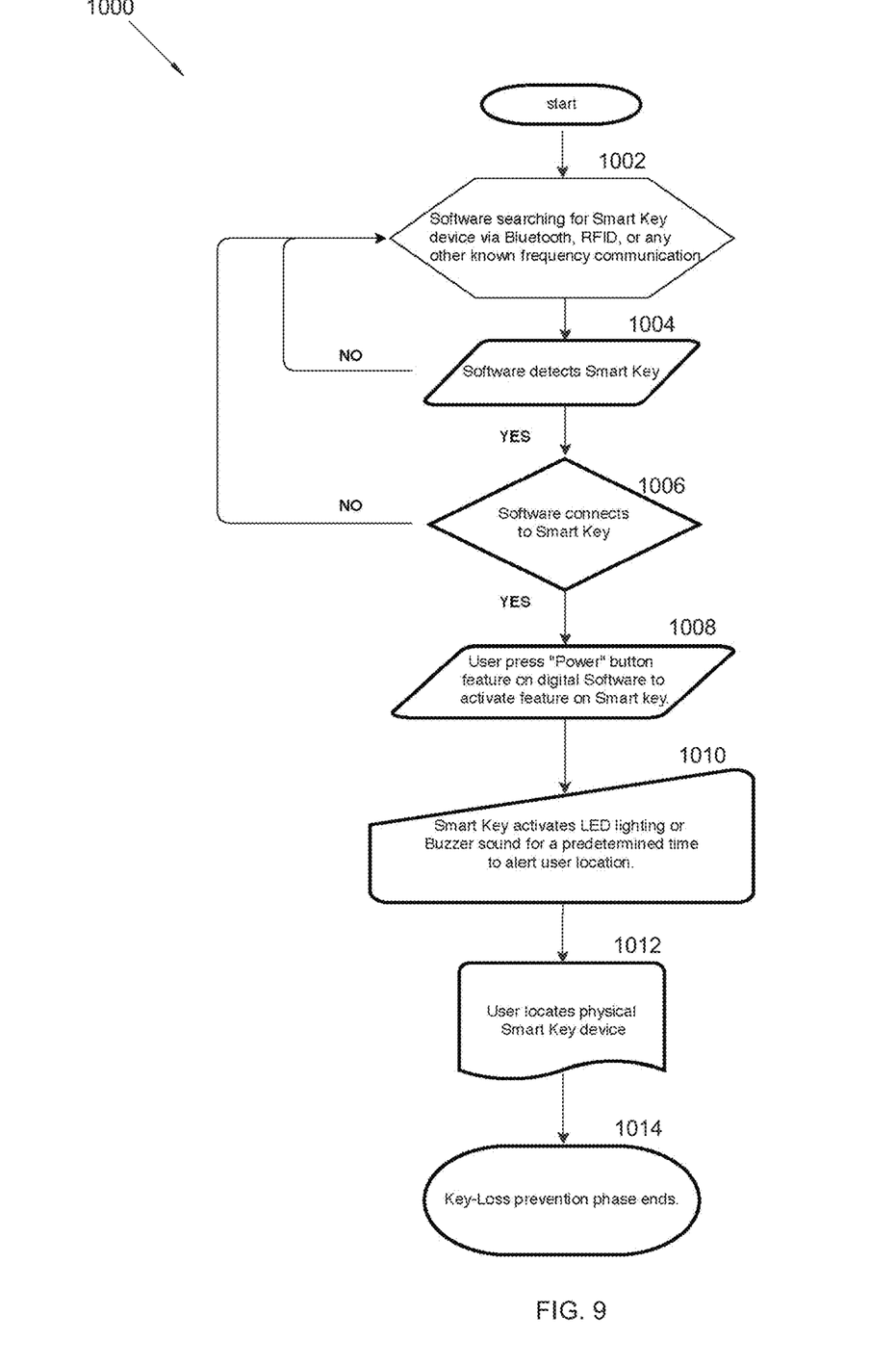
FIG. 9 illustrates a flowchart of an exemplary autonomous feature of the keyway illumination and key-loss prevention system, in accordance with an embodiment of the present invention.

FIG. 9 illustrates a flowchart of an exemplary manual key finding process 1000. The process 1000 may include an initial Step 1002 of the software searching for the smart key with Bluetooth, RFID, or other known frequency communications. The process 1000 may further comprise a Step 1004 of the software detecting the smart key. If not, the process 1000 returns to Step 1002. If yes, a Step 1006 involves the software connecting to the smart key 102. As discussed, this manual process is not fully autonomous. For example, a Step 1008 may include engaging a power button feature on the digital software to activate features on the smart key 102. Another Step 1010 may include the smart key self-activating an LED light or buzzer sound for a predetermined duration, so as to alert the user location. Continuing with process 1000, a Step 1012 comprises of the user locating the smart key—chiefly because of the LED light or buzzer. This serves to terminate the process 1000 in a Step 1014, where the key loss presentation phase terminates.

Figure 10:
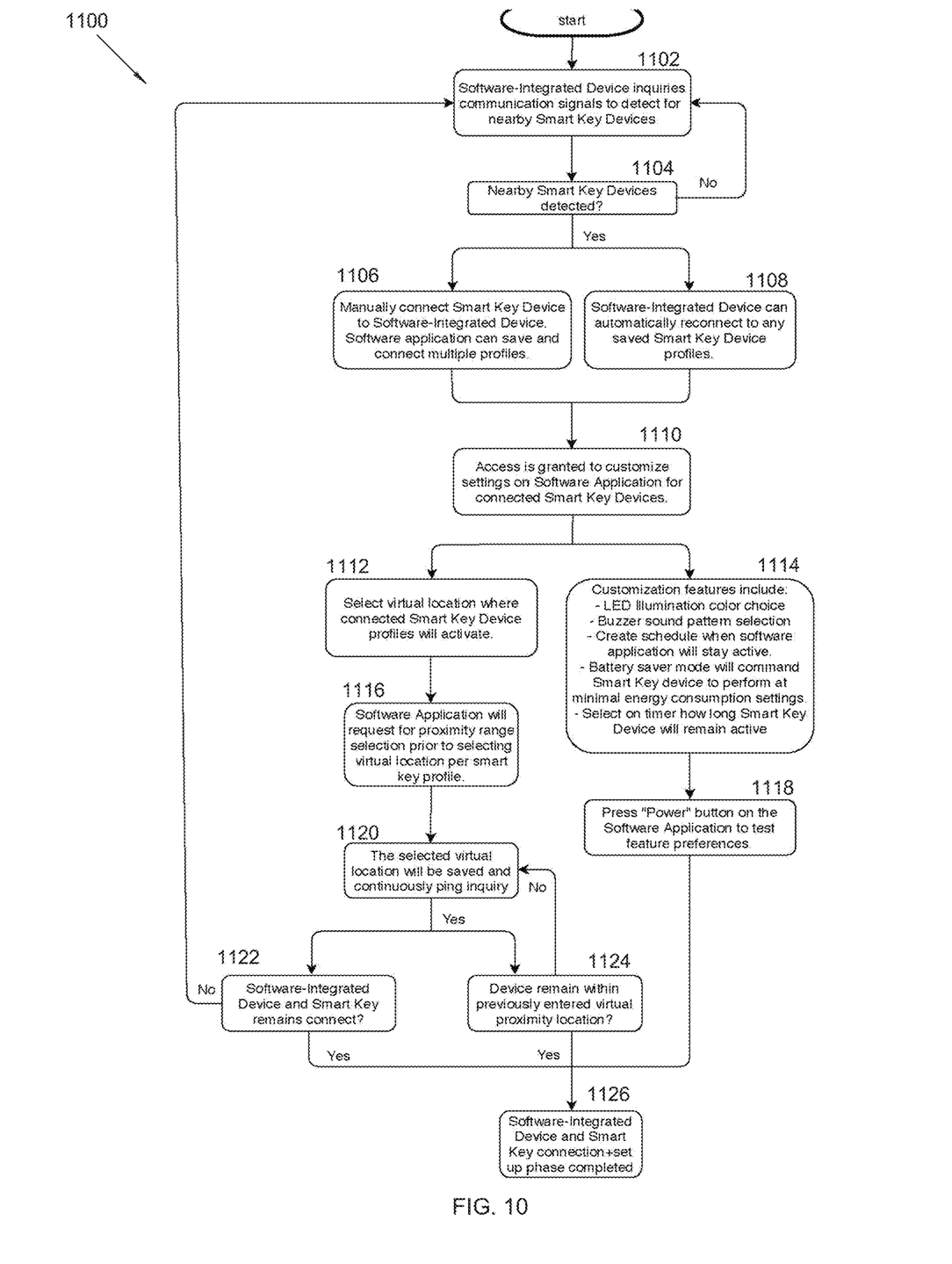
FIG. 10 illustrates a flowchart of an exemplary autonomous feature of a smart key connection and setup phase for the keyway illumination and key-loss prevention system, in accordance with an embodiment of the present invention.

FIG. 10 illustrates a flowchart of an exemplary autonomous feature of a smart key connection and setup phase process 1100 used to setup the keyway illumination and key-loss prevention system 100. The process 1100 is operable with a software-integrated device. The process 1000 may include an initial Step 1102 of software-integrated device inquiries transmitting signals to detect nearby smart keys. This can include transmitting signals in proximity to the keyway. A Step 1104 may include determining if smart key devices are nearby. If not, then a return to Step 1102 occurs. A manual Step 1106, or an automated Step 1108 occurs if the smart key is detected.

In Step 1106, a manual connection to the smart key to a software-integrated device, such that the software application can save and connect multiple profiles. The Step 1108 involves automatically connecting the smart key to a software-integrated device. At this point in the process 1100, a Step 1110 comprises granting access to customize setting on the software application for the smart key devices. Next, a Step 1112 comprises selecting virtual locations where the connected smart key devices will activate. Continuing from Step 1112, the process 1100 includes a Step 1116 of the smart key requesting proximity range selection prior to selecting the virtual location per smart key profile.

A subsequent Step 1120 to the aforementioned Step 1116 includes a Step 1120 continuously pinging an inquiry of the selected virtual location. A Step 1114 comprises the smart key device activates at least one customization feature, including: LED illumination color choice; buzzer sound pattern selection; schedule creation when the software application activates; actuating a battery saver mode that allows the smart key to perform with minimal energy consumption. After this is activated, a Step 1118 includes pressing a power button on the software application to test the feature preferences.

Continuing, a Step 1122 comprises follows both Step 1120 and Step 1118, for determining whether the smart key device and software-integrated application remain connected. A Step 1124 includes the smart key device remaining in the previously entered virtual proximal location. A final Step 1126 comprises completing the setup phase with the software device and smart key connection.

In conclusion, keyway illumination and key-loss prevention system and method. More so, the system provides a smart key having a master module, and a keyway having an integral slave module; whereby the modules are in operational communication with a mobile communication device that is operable with a positional detection software application; whereby the positional detection software identifies relative positions of the master and slave module for actuating an illumination device when the smart key enters the geofence of the keyway, and triggering an alert when the smart key exits the geofence of the keyway.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A keyway illumination and key-loss prevention system, the system comprising:
    a smart key comprising a blade and a housing, the blade being sized and dimensioned to engage a keyway;
    a master module operational in the housing of the smart key, the master module emitting a signal, the signal defining a positional information of the smart key;
    a slave module operational near the keyway, the slave module generating a geofence in proximity to the keyway;
    at least one communication device being in operational communication with the slave module near the keyway, the communication device further being in operational communication with the master module in the smart key, the communication device having a positional detection software, the positional detection software operational to process the positional information of the signal, the communication device, or the master module, or both, emitting an alert when the positional information indicates the master module exits the geofence of the keyway; and
    an illumination device operational at the housing of the smart key, the illumination device being in operational communication with the master module, the illumination device operational to illuminate when the positional information indicates the master module enters the geofence of the keyway.

2. The system of claim 1, wherein the communication device is operable with short-wavelength UHF radio waves.

3. The system of claim 1, wherein the master module transmits short-wavelength UHF radio waves to the communication device when the positional information indicates the master module exits and enters the geofence.

4. The system of claim 1, wherein the positional information comprises the position of the master module relative to the slave module.

5. The system of claim 1, wherein the illumination device at the smart key is further operational to illuminate when the positional information indicates the master module exits the geofence of the keyway.

6. The system of claim 1, wherein the communication device manually activates the illumination device to illuminate with a manual switch.

7. The system of claim 1, wherein the positional detection software uses at least one of the following to trigger the alert from the communication device: a global positioning system, a radio frequency identification, an electromagnetic frequency, a Wi-Fi, and a cellular data.

8. The system of claim 1, wherein the positional detection software uses at least one of the following to trigger the illumination from the illumination device: the global positioning system, the radio frequency identification, the electromagnetic frequency, the Wi-Fi, and the cellular data.

9. The system of claim 1, wherein the positional detection software processes the positional information to detect virtual proximity of the master module to the slave module through at least one of the following: the global positioning system, the radio frequency identification, the electromagnetic frequency, the Wi-Fi, and the cellular data.

10. The system of claim 1, wherein the positional detection software comprises a downloadable software application.

11. The system of claim 1, wherein the positional detection software is in communication with a radio tower or a global positioning system.

12. The system of claim 1, wherein the signal emitted from the master module comprises an infra-red signal.

13. The system of claim 1, wherein the alert from the communication device comprises a buzzer or a light.

14. The system of claim 1, wherein the housing of the smart key comprises a power source.

15. The system of claim 1, wherein the illumination device comprises a light emitting diode, the light emitting diode comprising multiple colors.

16. The system of claim 1, wherein the communication device includes at least one of the following: a smart phone, a tablet, a laptop, a computer, and a server.

17. The system of claim 1, wherein the communication device comprises a voice command software, the voice command software operable to trigger the alert when detecting a preprogrammed audible signal.

18. A keyway illumination and key-loss prevention system, the system comprising:

a smart key comprising a blade and a housing, the blade being sized and dimensioned to engage a keyway, the housing applying torque on the blade during engagement with the keyway;

a master module operational in the housing of the smart key, the master module emitting an infra-red signal, the infra-red signal defining a positional information of the smart key;

a slave module operational near the keyway, the slave module generating a geofence in proximity to the keyway, whereby the positional information comprises the position of the master module relative to the slave module;

at least one communication device being in operational communication with the slave module near the keyway, the communication device further being in operational communication with the master module in the smart key, the communication device having a positional detection software, the positional detection software operational to process the positional information of the signal, the communication device, or the master module, or both, emitting an alert when the positional information indicates the master module exits the geofence of the keyway, the communication device comprising a voice command software, the voice command software operable to trigger the alert when detecting a preprogrammed audible signal, whereby the master module transmits short-wavelength UHF radio waves to the communication device when the positional information indicates the master module exits the geofence;

an illumination device operational at the housing of the smart key, the illumination device being in operational communication with the master module, the illumination device operational to illuminate when the positional information indicates the master module enters the geofence of the keyway, the illumination device further being operational to illuminate when the positional information indicates the master module exits the geofence of the keyway, whereby the master module transmits short-wavelength UHF radio waves to the illumination device when the positional information indicates the master module enters the geofence; and a timer operational in the positional detection software, the timer deactivating the alert or the illumination device after a predetermined duration.

19. The system of claim 18, wherein the communication device further comprises a manual switch operable to activate the illumination device.

* * * * *